(12) United States Patent
Koizumi

(10) Patent No.: US 6,839,049 B1
(45) Date of Patent: Jan. 4, 2005

(54) PHYSICALLY INTERACTING WITH A PROCESSOR-BASED DISPLAY

(75) Inventor: David H. Koizumi, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 414 days.

(21) Appl. No.: 09/716,152

(22) Filed: Nov. 17, 2000

(51) Int. Cl.⁷ .......................... G06K 11/18; G09G 5/08; G09G 1/00
(52) U.S. Cl. ...................... 345/156; 345/158; 345/180; 178/19.05
(58) Field of Search ................. 345/156–158, 345/160, 166, 180–183; 178/19.01, 19.05

(56) References Cited

U.S. PATENT DOCUMENTS

| | | | | |
|---|---|---|---|---|
| 4,931,018 A | * | 6/1990 | Herbst et al. ............... 434/234 |
| 5,253,068 A | * | 10/1993 | Crook et al. ................ 348/734 |
| 5,600,348 A | * | 2/1997 | Bartholow et al. ......... 345/180 |
| 5,734,370 A | * | 3/1998 | Skodlar ....................... 345/156 |
| 6,012,980 A | * | 1/2000 | Yoshida et al. ................ 463/2 |
| 6,061,052 A | * | 5/2000 | Raviv et al. ................ 345/180 |
| 6,097,376 A | * | 8/2000 | Rothschild et al. ......... 345/180 |
| 6,146,278 A | * | 11/2000 | Kobayashi ................... 463/53 |
| 6,323,837 B1 | * | 11/2001 | Rosenberg .................. 345/156 |

* cited by examiner

*Primary Examiner*—Regina Liang
*Assistant Examiner*—Duc Q Dinh
(74) *Attorney, Agent, or Firm*—Trop, Pruner & Hu, P.C.

(57) ABSTRACT

A physical element may be caused to appear to interact with an image displayed on a computer display screen. The position of the element with respect to the display screen may be determined automatically. The user can then manipulate the element to cause an image, which may appear to be connected to the element, to be altered. Therefore, the user gets the impression that the element is capable of interacting and altering an image displayed on the display screen.

16 Claims, 4 Drawing Sheets

PHYSICALLY INTERACTING WITH A PROCESSOR-BASED DISPLAY

BACKGROUND

This invention relates generally to processor-based systems.

A processor-based system may include a display having a display screen. The display screen may display images generated by a processor-based system. Generally, there is no way to interact with the images generated on that system in any extensive fashion.

For example touch screens are available which enable the user to touch the display screen and thereby to select an icon displayed on the screen. However, this operation requires a specialized display screen. The display screen must include a sensor which detects the presence of the user's finger and thereby correlates that presence to the selection of an appropriate icon. Thus, the interaction that is possible is a direct result of the special configuration and construction of the display screen itself. Such interaction is not possible with any display screen. Moreover, additional expense may be incurred in providing a display screen which is also sensitive to touch.

With the advent of three dimensional graphics, relatively life-like images may be produced in computer displays. Ideally, the user would like to interact with those graphics. Currently, electronic interaction is possible through keyboards and other input devices.

Thus, there is a need for a way to physically interact with the images displayed on a computer display screen.

DETAILED DESCRIPTION

Figure 1:
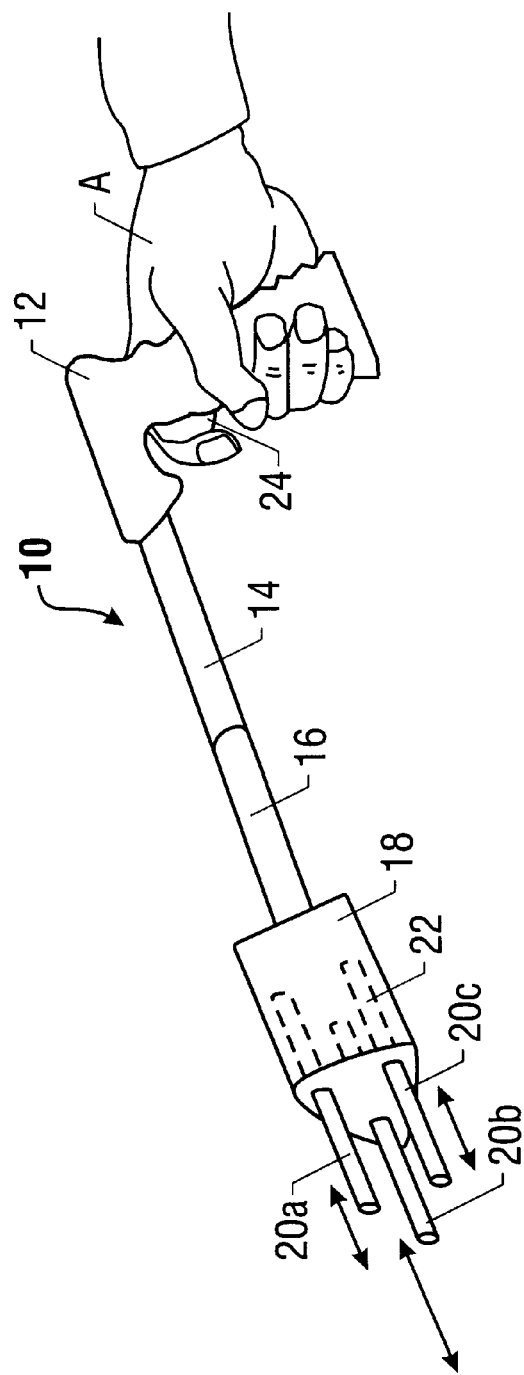
FIG. 1 is a perspective view of one embodiment of the present invention.

Referring to FIG. 1, an element 10 enables a user whose hand is indicated at A to interact with images being displayed on a computer display screen. In one embodiment, the element 10 includes a handle 12 that fits in the palm of the user's hand and presents a trigger 24 for operation by the user's index finger. Transversely connected to the handle 12, a telescoping shaft may include a proximal portion 14 and a distal portion 16.

The shaft portions 14 and 16 may be splined to prevent relative rotation. In one embodiment, the portions 14 and 16 are spring biased to extend apart unless constrained.

A sensor housing 18 may be coupled to the distal portion 16. The sensor housing 18 may include detectors 22 that may detect the positions of spring biased light pens 20. The spring biased light pens 20 telescope in and out of the housing 18 in the direction of the arrows. As the pens 20 extend in and out of the housing 18, the detectors 22 detect the position of each pen 20 relative to the housing 18.

Figure 2:
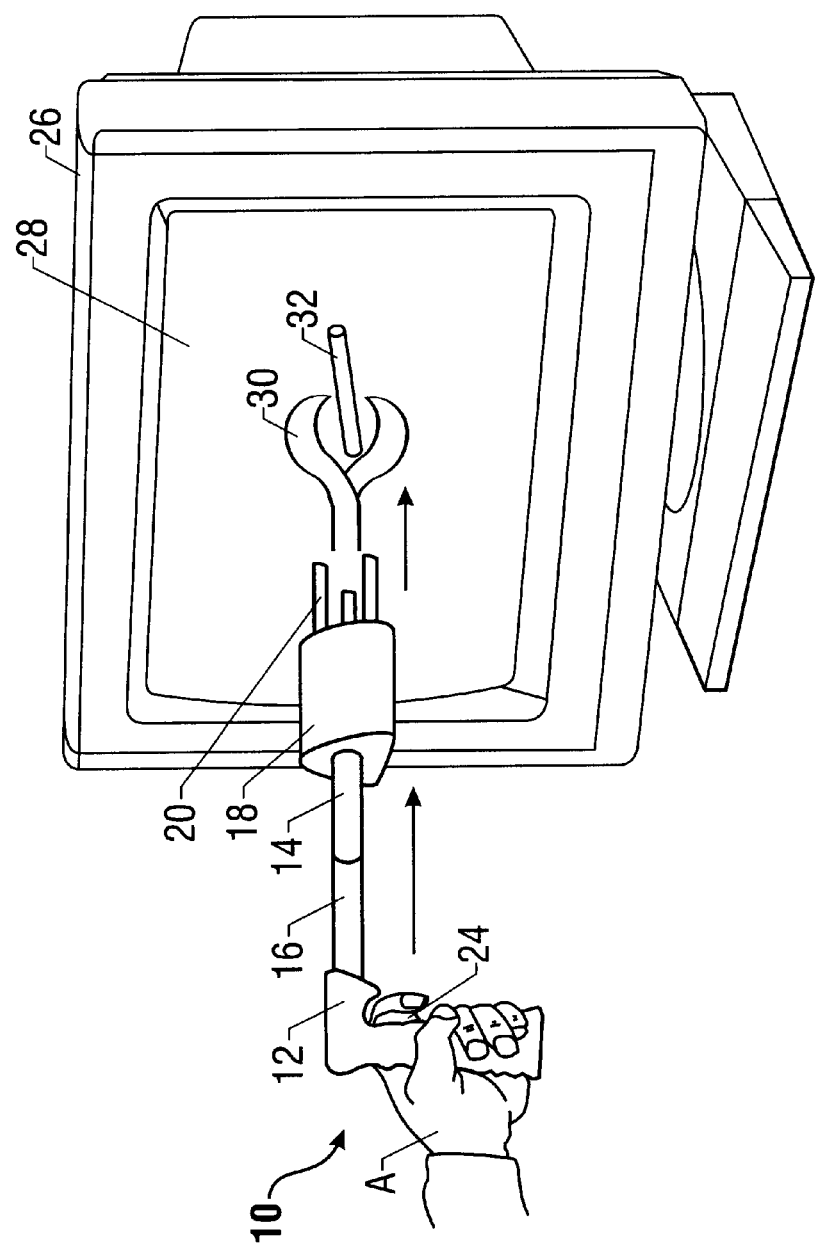
FIG. 2 is a perspective view of the embodiment shown in FIG. 1, with the user interacting with an image displayed on a display screen.

Thus, turning to FIG. 2, the element 10 is shown in position pressed against the display screen 28 of a computer display 26. The display 26 may be any type of computer display including a computer monitor.

In this case, the pens 20 are pressed against the screen 28. Because three equally spaced pens 20 are utilized, the angular orientation of the element 10 with respect to the display screen 28 may be determined-based on the extension of each of the pens 20 with respect to the housing 18. However in the alternative embodiments, the element orientation detectors and the light pens may be separate devices.

In some embodiments, the display screen 28, which may be glass, may be covered by another surface which may be flat and transparent. However, other shapes and transparencies may be used.

In the illustrated embodiment, the element 10 interacts with an image 30 displayed on the display screen 28. In one embodiment, the image 30 may be a scissors-type gripper. The gripper image 30 may grip a second image 32 such as a test tube. The user may press against the screen 28 to cause the images 30 and 32 to appear to extend "deeper" into the display screen 28. In actuality, the images 30 and 32 are altered to create this effect under computer control.

Thus, the exact position of the pens 20 on the display screen 28 may be determined in a fashion described hereinafter. The angular orientation and extension of the portions 14 and 16 may also be determined. As a result, the orientation of the element 10 with respect to the image 30 may be determined. This information may be utilized to allow the element 10 to seemingly interact with and actually alter the image 30. For example, as the user presses the element against the screen 28 against the spring bias between the portions 14 and 16, the image 30 may appear to extend further into the screen 28 as if the image 30 were actually part of the physical element 10. This allows the user, whose hand is indicated at A, to apparently physically interact with images 30, 32 displayed on the display screen 28.

Figure 3:
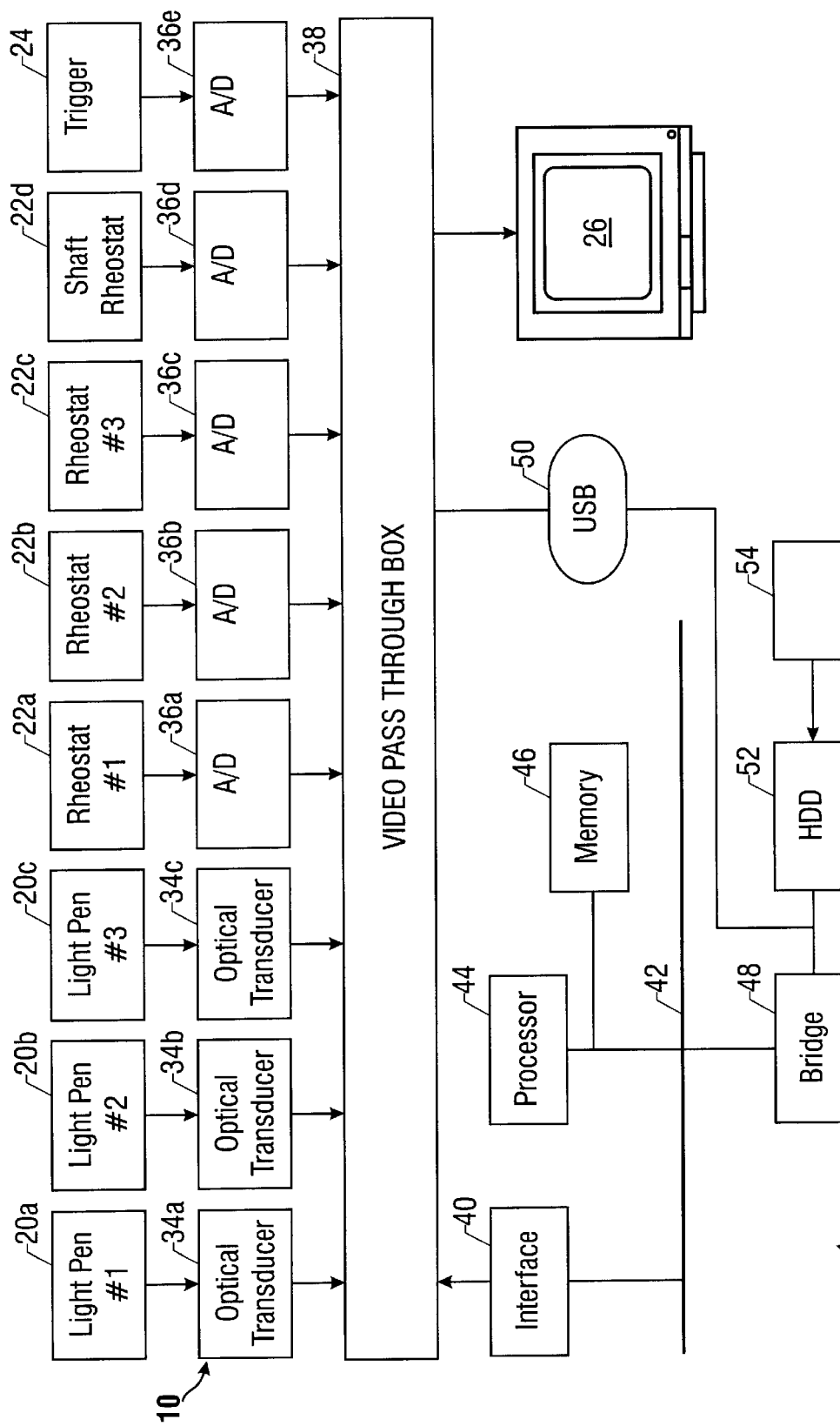
FIG. 3 is a block diagram in accordance with one embodiment of the present invention.

Referring to FIG. 3, the element 10 may be coupled to a processor-based system 39 through a video pass through box 38 in one embodiment. The video pass through box 38 may receive video control signals from the processor-based system 39 headed for the display 26. Thus, the pass through box 38 may receive the vertical and horizontal sync signals that the system 39 may generate to control the display 26 in one embodiment of the present invention. In addition, the pass through box 38 receives the detector 22 signals from the element 10.

The pass through box 38 may be of the type conventionally utilized with light pens to determine a location on a display screen selected by a light pen. An example of such a box is the PXL-2000 USB External Interface available from FastPoint Technologies, Inc., Stanton, Calif. However, other techniques for identifying the location of the light pens 20 on the display screen 28 may also be used.

The pass through box 38 may receive signals from the light pens 20a, 20b and 20c. Each light pens 20 may detect light signals generated by one or more pixels making up the display screen 28. The optical transducers 34 convert those light signals into electrical signals and provide them to the video pass through box 38. In one embodiment, the signals pass through the video pass through box 38 into a serial port such as a Universal Serial Bus hub 50 coupled to the processor-based system 39.

The detectors 22a–c that detect the extension of the pens 20 with respect to the housing 18 may also generate signals. In one embodiment, the detectors 22 may be rheostats that generate a signal indicative of the extent of spring biased extension of the pens 20 from the housing 18. Those analog signals may be converted to digital signals by the analog-to-digital converters 36. The digital signals may also pass through the pass through box 38 and the hub 50 to the processor-based system 39.

A detector 22d may be associated with the portions 14 and 16 to determine their relative extension. Thus, the detector 22d determines the relative positions of the portions 14 and 16 which may be the result of the user pressing the element 10 into the screen 28 or releasing that force. In one embodiment, all of the detectors 22 may be rheostats.

Finally, user operation of the trigger 24 may generate signals. Each time the user operates the trigger 24, the extent of trigger deflection and its duration may be encoded into an analog signal. That analog signal may be converted into a digital signal by the analog-to-digital converter 36e. This digital signal, like the other signals discussed above, is passed through the video pass through box 38 and the hub 30 to the processor-based system 39.

The processor-based system 39 may include a processor 44 coupled to system memory 46. The processor 44 may be coupled to a bus 42 which in turn is coupled to a graphics interface 40 in one embodiment. Signals generated by the processor 40 may be passed through the graphics interface 40 and the video pass through box to the video display 26.

A bridge 48 may also be coupled to the bus 42. In one embodiment, the bridge 48 may be coupled to the hub 50 as well as a storage device 52 which may be a hard disk drive. The storage device. 52 may store software 54 for controlling the interaction between the element 10 and the display screen 28.

The video pass through box 38 may receive the graphics signals intended for display on the video display 26. Thus, the box 38 may receive the vertical and horizontal sync signals as well. By extracting those vertical and horizontal sync signals, and comparing their timing to the timing of signals received from the light pens 20, the system 39 can determine the location of the light pens 20 on the display screen 28. In particular, the light pens 20 receive a flash of light when a particular underlying display screen 28 pixel is activated. The pixels may be sequentially activated in response to vertical and horizontal sync signals generated by the system 39. Thus, the time from vertical and horizontal sync signal to light flash is indicative of screen 28 position of the pens 20.

In one embodiment, a vertical sync signal is generated to start each new frame. A horizontal sync signal is generated with the beginning of each line. Thus, by knowing when a light signal is received by a light pen 20 relative to when a corresponding vertical sync signal and horizontal sync signal was detected, the system 39 may determine the vertical and horizontal coordinates of each light pen 20. The pass through box 38 may do the initial analysis to determine the pen 20 position or may simply forward the raw information onto the system 39 for analysis.

Figure 4:
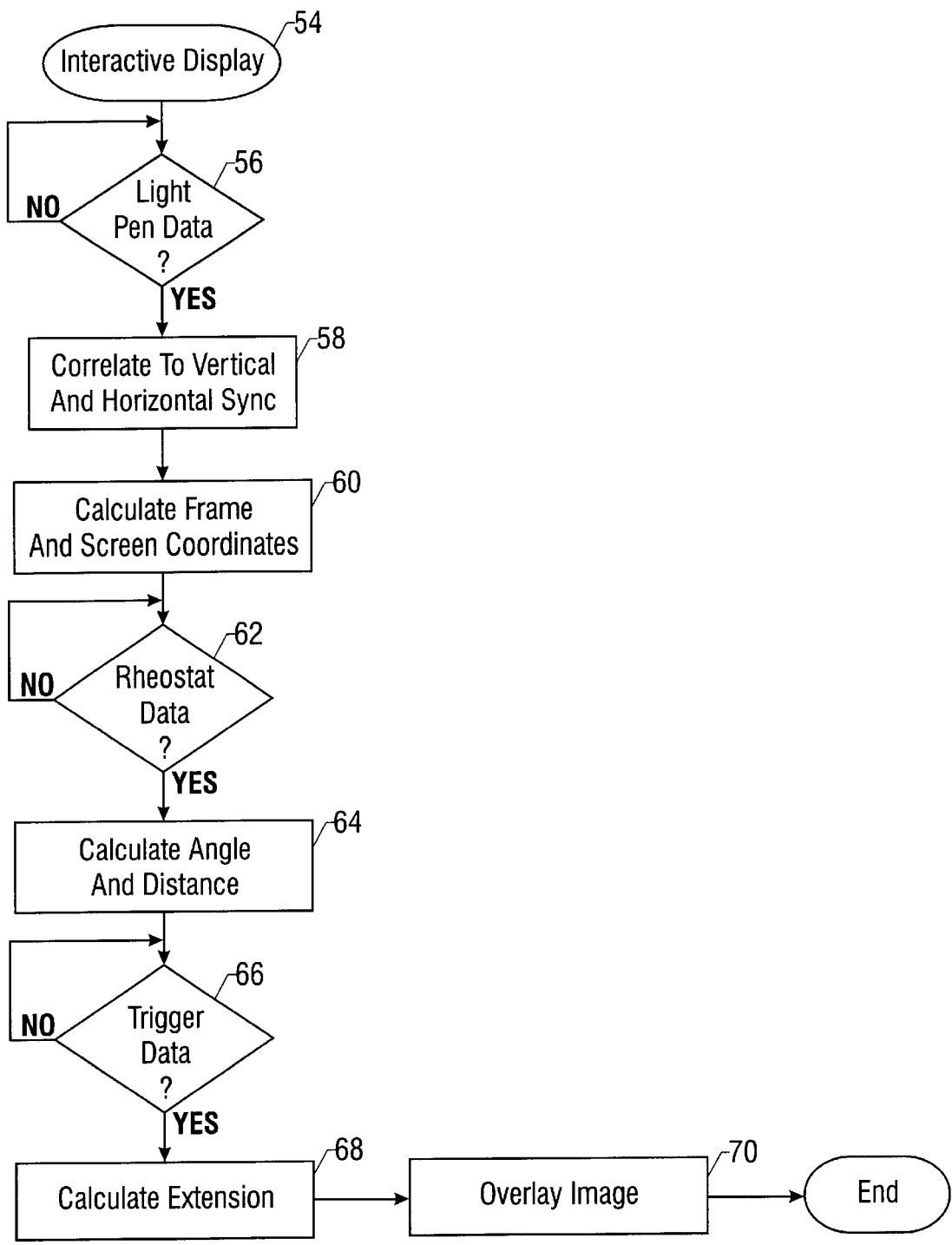
FIG. 4 is a flow chart for software in accordance with one embodiment of the present invention.

The software 54, shown in FIG. 4, may begin in one embodiment, by determining whether the light pen data has been received as indicated in diamond 56. If so, that data may be correlated to the vertical and horizontal sync signals as indicated in block 58. The frame and screen coordinates for each particular received light pen signal may then be determined as indicated in block 60.

Next, a check at diamond 62 indicates whether the detector 22 data was received, as indicated in diamond 62. If so, the angle of the element 10 with respect to the display screen 26 may be calculated. In addition, the distance of a handle 12 from the display screen is also calculated as indicated in block 64, using the shaft data from the portions 14 and 16.

A check a diamond 66 determines whether trigger activation has occurred. If so, an image such as the gripper image 30 may be altered. For example, the gripper image 30 may appear to "open". For each unit of trigger activation in terms of time, a corresponding operation may be created virtually on the display screen 28 in one embodiment.

Based on the change in relative position between the portions 14 and 16, relative motion of a handle 12 with respect to the display screen, or rotation of the handle 12 relative to the display screen, the orientations or images 30 and 32 may be recalculated. The signals that generate the images 30 and 32 may be received and the revised signals may be transmitted to the display screen 26 for a display as indicated in block 70.

The images 30 and 32 may be caused to move inwardly, as if they were coupled to the element 10, by pressing the element 10 harder against the screen 28. This action is detected by the detector 22d. Similarly, the element 10 may be rotated or angularly adjusted with respect to the screen causing a corresponding change in position of the images 30 and 32. This action is detected by the detectors 22a–c. Similarly, operation of the trigger 24 may cause the preprogrammed change in one or both images 30 and 32.

In each case, three dimensional manipulation of the element 10 may result in a corresponding three dimensional alteration of an image 30 or 32. As a result, it may seem that the element 10 is physically linked to an image 30 or 32.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A device comprising:
   a light sensor including a plurality of light pens to detect pixels on a display screen;
   a handle coupled to said light sensor; and
   detectors to detect the position of said handle relative to said light sensor and to generate signals indicative of said position.

2. The device of claim 1 including a shaft, said handle being coupled to the shaft which in turn is coupled to said light sensor, said handle being oriented substantially perpendicularly to said shaft.

3. The device of claim 2 wherein said handle includes a trigger.

4. The device of claim 1 wherein said detectors detect the angular orientation and extension of said light sensor with respect to said handle.

5. The device of claim 1 including at least three light pens.

6. The device of claim 5 wherein each of said light pens are spring biased.

7. The device of claim 6 wherein each of said light pens are spring biased and a detector detects the relative extension of said light pens with respect to said handle.

8. The device of claim 1 wherein said device develops signals to control the position of an image on a computer display.

9. The device of claim 1 including a unit to detect horizontal and vertical sync signals, said detectors coupled to said unit such that the position of said light sensor on a display screen can be determined.

10. A computer system comprising:

a processor;

a display coupled to said processor;

an element, coupled to said processor, including a light sensor, said element including a plurality of light pens to detect the orientation of said element with respect to said sensor; and an interface coupled to said processor to determine the location of said sensor with respect to said display.

11. The system of claim 10 including at least three light pens.

12. The system of claim 10 wherein each of said light pens are spring biased.

13. The system of claim 10 wherein each of said light pens are spring biased and the detector detects relative extension of said light pens with respect to said handle.

14. The system of claim 10 wherein said element includes a unit to detect horizontal and vertical sync signals, said detectors coupled to said unit in such that the position of said light sensor on a display screen can be detected.

15. A device comprising:

a light sensor to detect a pixel on a display screen;

a handle coupled to said light sensor;

a detector to detect the position of said handle relative to said light sensor and to generate signals indicative of said position; and a unit to detect horizontal and vertical sync signals, said detector coupled to said unit such that the position of said light sensor on a display screen can be determined.

16. The device of claim 15 wherein said detector includes a plurality of light pens.

\* \* \* \* \*